United States Patent

[11] 3,616,274

| [72] | Inventor | David S. Eddy |
| | | Roseville, Mich. |
| [21] | Appl. No. | 879,126 |
| [22] | Filed | Nov. 24, 1969 |
| [45] | Patented | Oct. 26, 1971 |
| [73] | Assignee | General Motors Corporation |
| | | Detroit, Mich. |

[54] METHOD AND APPARATUS FOR MONITORING EXHAUST GAS
5 Claims, 3 Drawing Figs.

| [52] | U.S. Cl. | 204/1 T, 204/195 |
| [51] | Int. Cl. | G01n 27/46 |
| [50] | Field of Search | 204/1 T, 195 |

[56] References Cited
UNITED STATES PATENTS

| 3,347,767 | 10/1967 | Hickam | 204/195 |
| 3,442,773 | 5/1969 | Wilson | 204/1 T |
| 3,464,008 | 8/1969 | Meysson et al. | 204/195 |
| 3,468,780 | 9/1969 | Fischer | 204/195 |
| 3,514,377 | 5/1970 | Spacil et al. | 204/195 |

*Primary Examiner*—T. Tung
*Attorneys*—William S. Pettigrew, R. J. Wallace and Lawrence B. Plant

ABSTRACT: A solid electrolyte, electrochemical exhaust gas sensor which is self-correcting with respect to maintaining its operating temperature substantially constant. The sensor comprises two electrochemical cells sharing a common electrolyte but externally loaded differently to produce different terminal voltages. An electronically detected imbalance between the two voltages produces a thermal correction signal which activates appropriate heating or cooling means.

PATENTED OCT 26 1971   3,616,274

INVENTOR.
David S. Eddy
BY
Lawrence B. Plant
ATTORNEY

METHOD AND APPARATUS FOR MONITORING EXHAUST GAS

High temperature galvanic cells of the solid electrolyte type have been proposed for use as oxygen gages or as sensors of unburned conbustibles in furnace stack gases. The voltage produced by such cells can be directly read out or used to control the air or fuel input to furnaces or reactors to insure the hottest and cleanest burns possible. This, in turn, produces cleaner stack gases. Such cells are generally described in Hickman U.S. Pat. No. 3,347,767. Such cells generally comprise a tube of an oxygen-ion-conductive solid electrolyte, such as zirconia or yttria which has two electrodes, one on the inside of the tube and the other on the outside of the tube. In one application, the outer electrode is exposed to a reference gas (e.g., air) having a substantially known oxygen partial pressure. The inner electrode is exposed to a furnace's exhaust gas. If the exhaust gas is rich in oxygen, a concentration cell is formed between the oxygen in the air and the oxygen in the gas. The output voltage of this concentration cell is indicative of the unknown oxygen concentration in the exhaust gas. If the burning mixture is lean with respect to oxygen, such that there is oxygen deficient combustion, the unburned combustibles in the stack gases act as a fuel and the oxygen coming through the electrolyte from the air acts as an antifuel and a fuel cell is formed. In this latter case, the output voltage produced is also indicative of the composition of the exhaust gas, at least to the extent of indicating wheather the exhaust gas is rich in combustion or oxygen. By application or the principles of stoichiometry, the composition of the exhaust gas can be related to the air-fuel ratio (A/F) in the furnace or reactor.

At constant electrolyte temperature, the output voltage of a $ZrO_2$ solid electrolyte cell is dependent on, and relatable to, the air-fuel ratio in the reactor, since this ratio determines the composition of the exhaust gas being monitored. Since solid electrolyte cells have virtually no electrode polarization problems, the current-voltage (I-V) characteristics of constant temperature cells are generally linear. The slope of this linear I-V characteristic is virtually independent of the air-fuel ratio and depends only on the resistance of the solid electrolyte. As a result, for $ZrO_2$ solid electrolyte cells, the I-V characteristics for most air-fuel ratios can be depicted as a family of virtually parallel lines (see FIG. 3a). The terminal voltages from such cells, when used as gas composition sensors, can be read out directly or be amplified to form a signal which is usable to control a damper or the like to throttle air or fuel into the reactor to maintain the most efficient air-fuel ratio therein.

Solid electrolyte cells of the type described are temperature sensitive due to the semiconductive properties of the electrolyte. That is to say, when loaded with a resistor of low value compared to the internal resistance of the cell, the terminal voltage of the cell is significantly affected by the temperature of the electrolyte. The resistivity of the solid electrolyte increases with decreasing temperatures. Accordingly, the slope of the I-V curve increases as the temperature decreases and vice versa when the sensed gas composition is constant.

In order to obtain a voltage which is meaningfully indicative of just the exhaust gas composition, the temperature of the cell's electrolyte should be held substantially constant. This is essentially true where such cells are used to monitor the exhaust gases of internal combustion engines where, depending on atmospheric conditions, engine speed and load, the exhaust gases will vary in temperature from about 800° F. to about 1,200° F. at the muffler and even higher at the exhaust manifold contiguous the engine. The temperature of the exhaust gas directly influences the temperature of the $ZrO_2$ electrolyte placed in the exhaust gas stream. Changes in electrolyte temperature should be quickly sensed and corrective action taken to stabilize and maintain the desired constant electrolyte temperature. Thermocouples placed near the electrolyte will only sense the temperature of the surrounding environment, not the electrolyte itself. Accordingly, a thermocouple contacting the gas stream will not provide an adequate temperature-sensing means which is rapidly responsive to temperature variations of the electrolyte.

An object of this invention is to provide an exhaust gas sensing device of the solid electrolyte, galvanic cell type which is most particularly adapted to sensing the composition on internal combustion engine exhaust gases and which is capable of producing its own thermal correction signal, which signal automatically triggers the activation or deactivation, as required, of appropriate heating or cooling means to maintain the temperature of the device substantially constant, regardless of the temperature of the exhaust gas itself.

A further object of this invention is to refine the sensitivity of a solid electrolyte, electrochemical cell type, gas composition sensor by virtually eliminating the influence of electrolyte temperature variations on the terminal voltage of the sensor.

These and other objects and advantages of this invention will become increasingly apparent from the detailed description which follows: FIG. 1 depicts a use of this invention in connection with an internal combustion engine.

Figure 1:
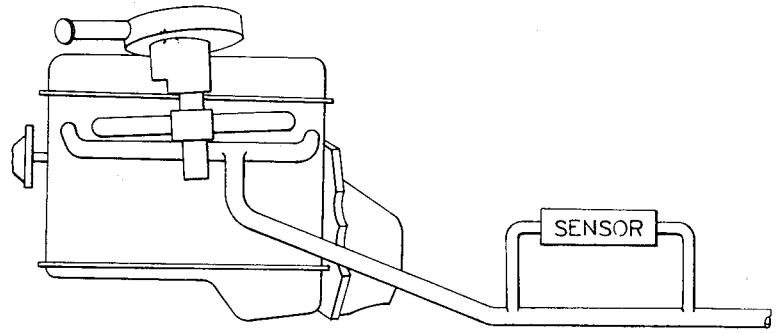

In a preferred form, an exhaust gas sensor, of the general type described, is hereby provided which comprises two separate cells sharing a common base of solid $ZrO_2$ electrolyte, The two cells are located sufficiently close to each other so as to be essentially in the same thermal environment. The electrolyte is in the form of a tube through which the gas to be analyzed is passed. The tube is surrounded by heating and/or cooling means which responds to a signal that indicates the need for a temperature correction if a constant electrolyte temperature is to be maintained. Each cell is externally loaded through separate resistors which have substantially different values. The first cell is loaded with a very high resistance (as compared to the internal resistance of the cell) whose load line most nearly passes through the approximate center of the locus of points representing the approximate intersection of the I-V curves for that cell, when operating under conditions of varying temperature and constant gas composition. For fuel-rich, reducing gases this intersection is to the right of the voltage axis (see FIG. 3b), while for fuel-lean, oxidizing gases this intersection is to the left of the voltage axis (not shown). The second cell is loaded through a low resistance (as compared to the internal resistance of the cell) such that the cel's terminal voltage is quite close to the cell's voltage under short circuit conditions. After an appropriate division or attenuation of the first cell's voltage, a voltage comparator compares the terminal voltage of the second cell with an attenuated voltage from the first cell which is proportional to the open circuit voltage of the first cell, Depending on the differences between the compared voltages, the comparator produces an electronic signal which is dependent on the cell's temperature and independent of the gases composition. The comparator's signal is used to trigger the activation or deactivation of an appropriate heating or colling system for maintaining the cell's temperature at the desired constant level. In one particular application, i.e., sensing the composition of an internal combustion engine's exhaust gas, a tubular zirconia, solid electrolyte cell mounted at or near the muffler is operated at about 1,340° F., which is well above the 800° F. to 1,200° F. temperature of the exhaust gases at that point in the system. Under these conditions, only a heater is required, since electrolyte cooling is attained by merely deactivating the heater.

Though the slope of the I-V characteristics of these cells changes with temperature, under constant gas composition conditions (see FIG. 3b), there is a region, or locus of points P (FIG. 3b) through which substantially all the discharge curves pass. The location of this region P will vary depending on whether the gas is oxidizing or reducing in character, as indicated heretofore. This region amounts to an approximate pivot point where the lines of varying slope meet. If one of the cell is loaded with a high resistance, which has a load line passing through this region, the terminal voltage of that cell under load is virtually independent of temperature and accordingly is responsive primarily to the composition of the exhaust gases to which it is exposed. Since the region P can shift from left to right of the voltage axis as the gas composition changes from oxidizing to reducing, I prefer to use a resistance which is so high that the terminal voltage of the first cell is nearly the open circuit voltage of that cell.

Figure 2:
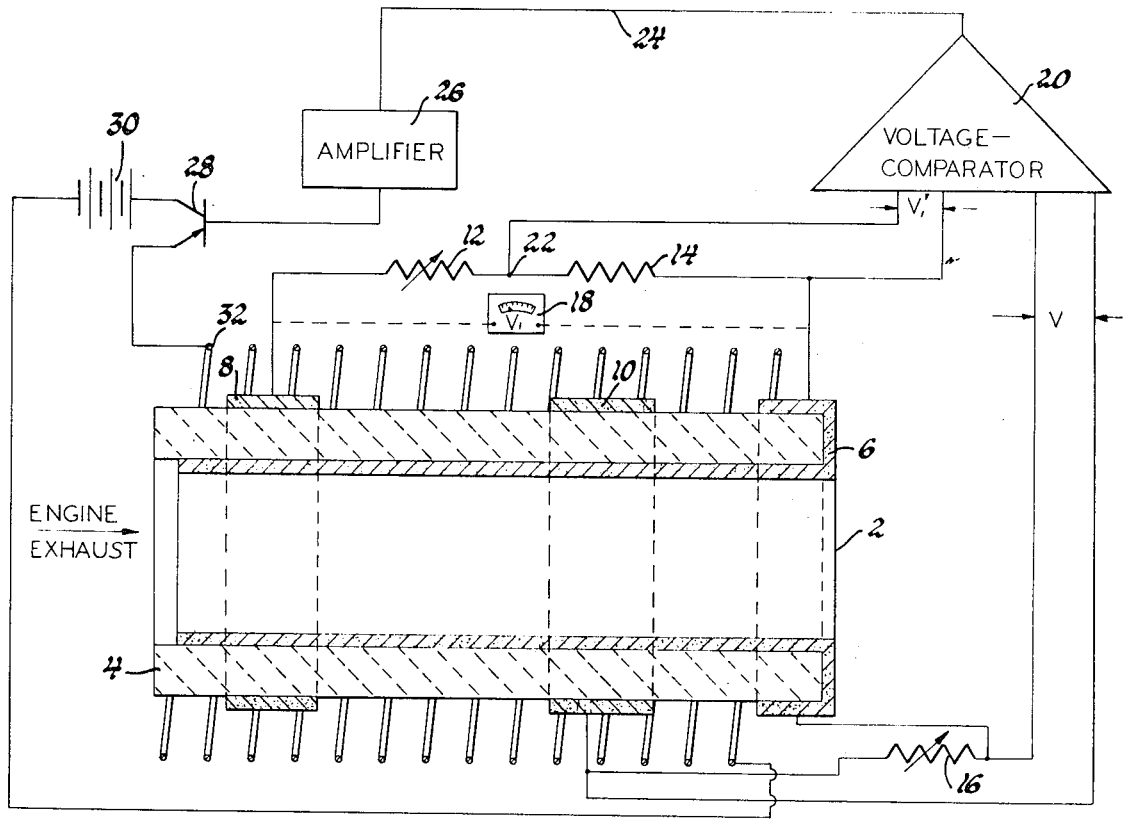
FIG. 2 is a sectioned, schematic representation of one embodiment of thin invention.

In connection with FIG. 2, there is shown an exhaust gas composition sensor 2 comprising a tube 4 of zirconia, an inner electrode 6 and two outer electrodes 8 and 10. Outer electrode 8 is electrically connected to inner electrode 6 through a load formed by the resistors 12 and 14. This cell is herein referred to as the first cell. Load 14 is a resistor having a value of about 10 to about 1,000 ohms. Load 12 is a variable resistor having a range of about 10 times to 100 times that of resistor 14. Hence, for example, when resistor 14 has a value of 1,000 ohms, resistor 12 will range from about 10,000 ohms to about 100,000 ohms. The combination of the variable resistor 12, the fixed resistor 14 and the voltage tap 22 results in a load which is, in effect, a voltage divider having a load line such as 34 (FIG. 3b), and which produces the near open circuit voltage of the first cell. The outer electrode 10 is electrically connected to inner electrode 6 through resistor 16 and forms what is hereinafter referred to as the second cell. The resistor 16 is a variable resistor having a range of about 10 to 100 ohms and a load line like 36 (FIG. 3b).

When the total resistance across resistors 12 and 14 is very high, in relation to the internal resistance of the cell, the terminal voltage of the first cell ($v_1$) approaches the open circuit voltage of that cell. When used as a sensor for internal combustion engine exhaust gases, this cell can be expected to operate in a temperature range of about 800° F. to about 1,500° F. At these temperatures, the open circuit voltage of the first cell is significantly dependent on the composition of the exhaust gas and less dependent on the cell's internal resistance which is affected by the cell's temperature. Accordingly, with a high external resistance (i.e., 12 and 14), the first cell becomes somewhat temperature insensitive over quite a wide range of temperatures. Nonetheless, the voltage ($V_1$) of the first cell will vary both with temperature and gas composition and, accordingly, must be considered as a mixed voltage not solely indicative of gas composition.

Figure 3:
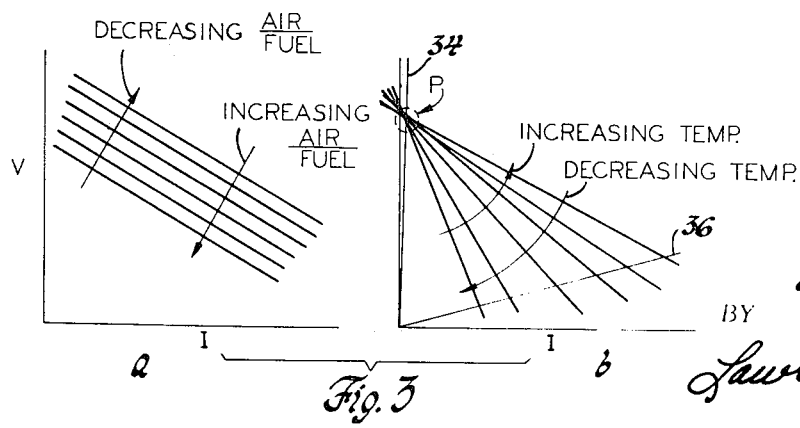
FIG. 3 shows current-voltage (I-V) plots of the discharge characteristics of $ZrO_2$ cells under (a) constant temperature-variable gas composition and (b) constant gas composition-variable temperature conditions.

The second cell, on the other hand, has a comparatively low resistance 16 across it (e.g., see load line 36 in FIG. 3b). As a result, the second cell's internal resistance becomes the principal current controller. The cell's internal resistance varies considerably with temperature and, accordingly, the thusly loaded second cell's terminal voltage ($V_2$) is very responsive to temperature variations as well as variations in gas composition. Accordingly, the terminal voltage $V_2$ of the second cell is also a mixed voltage, but one which is more responsive to temperature variations than is the voltage $V_1$ of the first cell.

The outputs of the first and second cells are compared in a voltage differential comparator 20. That is to say, the attenuated voltage $V_1'$ from the first cell is compared to the voltage $V_2$ from the second cell. Any voltage imbalance is directly relatable to changes in cell temperature, as will be pointed out hereinafter. The comparator 20 produces a thermal correction signal 24 which controls the activation or deactivation of a heating or cooling means 32 when a voltage imbalance occurs between the two cells. The temperature of the cell's electrolyte is thereby maintained substantially constant. With temperature eliminated as a variable, the voltage $V_1$ becomes a true, meaningful indicator solely of the composition of the exhaust gases. The temperature-corrected first cell produces a voltage $V_1$ which can then be read out directly, as by a voltmeter 18, or used as a signal voltage which, when appropriately amplified, controls metering means to automatically control air or fuel input to a reactor or engine. The voltmeter 18 is calibrated in terms of engine input air-fuel ratios. Voltages values for the different air-fuel ratios are ascertained by testing the device against a number of gases having predetermined oxygen and unburned hydrocarbon content. In addition to controlling air-fuel ratios, the composition of the exhaust gas can be used to evaluate other engine conditions such as operating efficiency, tunning, etc. Accordingly, the read-out voltage $V_1$, once obtained, can be related to engine conditions other than the combustion mixture.

The terminal voltage $V_1$ of the first cell is close to the cell's open circuit voltage. The terminal voltage $V_2$ of the second cell is much less, owing to the near short circuit conditions of this cell. Therefore, a direct comparison of $V_1$ and $V_2$ is not possible. A voltage tap 22 in the divided load (12-14) divides the voltage $V_1$ into a sub-voltage $V_1'$ which is proportional to the voltage $V_1$ but which is on the same order of magnitude as the voltage $V_2$. A direct comparison can be made between the voltage $V_1'$ and the voltage $V_2$ using a typical voltage differential comparator 20. The voltage differential comparator 20 produces a signal 24 which is positive when the voltage of the first cell is too high with respect to that of the second cell and negative when the first cell's voltage is too low with respect to that of the second cell. The gas composition is the same for both cells at any given point in time. Hence, a change in the voltage $V_2$ of the second cell attributable to a composition change will not trigger the signal 24 since a related voltage change will occur at the first cell the voltages $V_1'$ and $V_2$ maintain the same relationship with respect to each other. In effect then, the comparator modulates the response of the second cell in accord with response of the first cell to compensate for changes in gas composition. The signal 24 is amplified through amplifier 26 which turns a transistor switch 28 on to supply energy from battery 30 to the heating coils 32 to heat the cell when and if needed. If the cell gets too hot, the reverse occurs and the switch 28 turns off.

In one particular example of this invention an exhaust gas sensor was comprised of a tube of lime-stabilized zirconium oxide. The tube was 6 inches long, had a ⅜-inch outside diameter and a 1/16-inch wall thickness. The electrodes were formed with a silver paint, known as DuPont silver preparation No. 4731. After drying the electroded tube was fired at 700° C. for 5 minutes. Experimental laboratory exhaust gas mixtures were used. The chemical composition of these gases was mixed in accordance with the expected composition of exhaust gases having nominal air-fuel ratios varying between 12:1 to 17:1 (dry basis) and for a hydrogen/carbon ratio of 1.75. The composition of these gases is shown in table 1 below.

Table 1

| Air-Fuel Ratio | $O_2$ | $CO_2$ | CO | $H_2$ | $C_{3s}$ | $N_2$ |
|---|---|---|---|---|---|---|
| 12:1 | 0.2 | 11.2 | 6.5 | 2.1 | 0.15 | bal |
| 13:1 | 0.2 | 13.0 | 2.7 | 1.0 | 0.1 | bal |
| 14:1 | 0.4 | 14.8 | 1.1 | 0.3 | 0.05 | bal |
| 15:1 | 0.7 | 14.9 | 0.3 | 0.1 | 0.05 | bal |
| 16:1 | 2.1 | 13.9 | 0.1 | 0 | 0.05 | bal |
| 17:1 | 3.3 | 13.0 | 0.1 | 0 | 0.05 | bal |

The temperature of the tube was automatically held substantially constant at 1,292° F. The test gases were passed through the tube at a rate of 0.5 liters per minute and atmospheric air used outside the tube. The voltage $V_1$ were recorded. Table 2 reflects the average open circuit voltages $V_1$ recorded in millivolts for the nominal air-fuel ratio of each experimental gas.

TABLE 2

A/F Ratio

| 12:1 | 13:1 | 14:1 | 15:1 | 16:1 | 17:1 |
|---|---|---|---|---|---|
| 140 | 118 | 78 | 60 | 35 | 27 |

The data shown in table 1 and table 2 demonstrates that, under usual circumstances, the cell intend is related to the air-fuel ratio. It is noted that the ability to derive an engine's air-fuel ratio from the cell voltage is dependent on the relation between the exhaust gas composition and the engine air-fuel ratio. Any variations of the exhaust gas composition not associated with air-fuel ratio and not otherwise compensated for tends to diffuse the relation between cell voltage and air-fuel ratio.

While we have disclosed our invention solely in terms of a specific embodiment thereof, we do not intend to be limited thereto, except to the extent hereinafter set forth.

I claim:

1. A method of accurately sensing the oxygen and combustible content of an internal combustion engine's exhaust gas over a broad range of gas temperatures comprising the steps of:
 providing a solid-electrolyte, electrochemical gas sensor comprising a body of an oxygen-ion-conducting material and having two pairs of electrodes defining respectively first and second electrochemical cells;
 interposing said sensor between said exhaust gas and a reference gas such that said cells each produce a voltage which is responsive to variations in the composition of said exhaust gases and the temperature of said body;
 loading the first of said cells with a resistance which is high in relation to the internal resistance of said first cell to provide a first voltage which approaches the opencircuit voltage of said first cell and to render said first cell comparatively temperature insensitive;
 loading the second of said cells with a resistance which is low in relation to the internal resistance of said second cell to provide a second voltage which approaches the short circuit voltage of said cell and to render said second cell temperature supersensitive;
 attenuating said first voltage to a value approximating that of said second voltage;
 sensing any difference between said second voltage and said attenuated first voltage;
 producing a thermal correction signal responsive to said difference between said second voltage and said attenuated first voltage to trigger appropriate heating or cooling means for maintaining the temperature of said sensor substantially constant over the general range of cell operation; and
 using said first voltage to measure the composition of the engine's exhaust gas.

2. A method of operating an internal combustion engine including the steps of monitoring the oxygen and hydrocarbon content of said engine's exhaust gases with a thermally-corrected, oxygen-ion-conducting, solid-electrolyte, electrochemical gas sensor having at least two pairs of electrodes on a body of said electrolyte and defining respectively first and second electrochemical cells, which are respectively loaded with high and low resistances in relation to the internal resistances of said cells to provide respectively a first voltage and a second voltage,
 attenuating said first voltage to a value approximating that of said second voltage;
 sensing any difference between said second voltage and said attenuated first voltage to determine if a thermal correction is needed;
 as required, producing a thermal correction signal responsive to said difference between said second voltage and said attenuated first voltage to trigger appropriate heating or cooling means for maintaining the temperature of said sensor substantially constant over the general range of cell operation and thereby rendering said first voltage virtually solely exhaust gas composition dependent; and
 varying an engine operating condition that alters the oxygen content of the exhaust gases in response to the first voltage and in the sense to bring said first voltage to a predetermined value for the specific engine operating conditions.

3. An internal combustion engine exhaust gas sensor for measuring the chemical content of said engine's exhaust gases through the spectrum extending from predetermined oxygen content through predetermined unburned hydrocarbons content, comprising in combination:
 a solid-electrolyte, electrochemical sensing device comprising a body of an oxygen-ion-conducting material and having at least two pairs of electrodes defining respectively first and second electrochemical cells, said device being interposed between said exhaust gases and a reference gas such that said cells each produce a voltage which is responsive to variations in the composition of said exhaust gases and the temperature of said body;
 a high resistance in relation to the internal resistance of said first cell connected across said first cell, the value of said resistance defining a load line passing substantially through the locus of points which approximately define a region on the voltage-current chart through which region the voltage-current curves for said first cell pass under conditions of differing temperatures in the general range of cell operation;
 a resistance of low value in relation to the internal resistance of said second cell connected across said second cell;
 a heater located to heat said device when energized;
 means to energize said heater primarily in response to the voltage across said second cell and in sense to maintain constant the temperature of said device, while modulating the response of said second cell in accord with the voltage across said first cell in direction and amount to compensate for the influence of exhaust gas composition on the voltage of said second cell; and
 means responsive to the voltage across said first cell thereby measuring the chemical content of the engine's exhaust gases.

4. An internal combustion engine exhaust gas sensor for measuring the chemical content of said engine's exhaust gases through the spectrum extending from predetermined oxygen content through predetermined unburned hydrocarbons content, comprising in combination;
 a solid-electrolyte, electrocheimcal sensing device comprising a body of an oxygen-ion-conducting material and having at least two pairs of electrodes defining respectively first and second electrochemical cells in which one electrode of each pair is common to both cells, said device being interposed between said exhaust gases and a reference gas such that said cells each produce a voltage which is responsive to variations in the composition of said exhaust gases and the temperature of said body; a high resistance in relation to the internal resistance of said first cell connected across said first cell, the value of said resistance defining a load line passing substantially through the locus of points which approximately define a region on the voltage-current chart through which region the voltage-current curves for said first cell pass under conditions of differing temperatures in the general range of cell operation;
 a resistance of low value in relation to the internal resistance of said second cell connected across said second cell;
 a heater located to heat said device when energized;
 means to energize said heater primarily in response to the voltage across said second cell and sense to maintain constant the temperature of said device, while modulating the response of said second cell in accord with the voltage across said first cell in direction and amount to compensate for the influence of exhaust gas composition on the voltage of said second cell; and
 means responsive to the voltage across said first cell thereby measuring the chemical content of the engine's exhaust gases.

5. An internal combustion engine exhaust gas sensor for measuring the chemical content of said engine's exhaust gases through the spectrum extending from predetermined oxygen content through predetermined unburned hydrocarbons content, comprising in combination;

a solid-electrolyte, electrochemical sensing device comprising a body of an oxygen-ion-conducting material and having at least two pairs of electrodes defining respectively first and second electrochemical calls, said device being interposed between said exhaust gases and a reference gas such that said cells each produce a voltage which is responsive to variations in the composition of said exhaust gases and the temperature of said body; a high resistance in relation to the internal resistance of said first cell connected across said first cell, the value of said resistance defining a load line passing substantially through the locus of points which approximately define a region on the voltage-current chart through which region the voltage-current curves for said first cell pass under conditions of differing temperatures in the general range of cell operation;

a resistance of low value in relation to the internal resistance of said second cell connected across said second cell; means for attenuating the voltage from said first cell to a value about equal to the voltage of said second cell;

a heater located to heat said device when energized; and means for comparing the attenuated voltage from said first cell with the voltage of said second cell and energizing said heater when a voltage imbalance occurs to maintain constant the temperature of said device.

* * * * *